United States Patent

[11] 3,615,282

| [72] | Inventors | George H. Eichelman, Jr.<br>Cheshire;<br>Michael J. Pryor, Woodbridge, both of Conn. |
|---|---|---|
| [21] | Appl. No. | 796,921 |
| [22] | Filed | Feb. 5, 1969 |
| [45] | Patented | Oct. 26, 1971 |
| [73] | Assignee | Olin Corporation |

[54] HIGH-STRENGTH FUSION WELDS IN BETA COPPER-ALUMINUM ALLOYS
7 Claims, No Drawings

[52] U.S. Cl. ................................................. 29/199, 29/487, 29/504
[51] Int. Cl. ........................................................ B23p 3/00
[50] Field of Search ........................................... 29/199, 487, 499, 503, 504; 75/162

[56] References Cited
UNITED STATES PATENTS

| 2,190,267 | 2/1940 | Light | 29/499 |
| 3,176,410 | 4/1965 | Klement | 29/199 UX |
| 3,290,182 | 12/1966 | Eichelman, Jr. et al. | 29/487 X |
| 3,347,717 | 10/1967 | Eichelman, Jr. et al. | 75/162 X |
| 3,484,307 | 12/1969 | Eichelman, Jr. et al. | 75/162 X |

OTHER REFERENCES

Garriott, Emery F., " Evolutionary Trends in Fabricating Aluminum," Welding Journal, 1966 Vol. 45, June, pp. 481– 492

Wilson, C. V., " Welding of Aluminum Bronze-I," Metal Industry, March 5, 1964, Vol. 104, pp. 316– 319

Wilson, C. V. " Welding of Aluminum Bronze-II," Metal Industry, March 12, Vol. 104, 1964, pp. 348– 351

Primary Examiner—John F. Campbell
Assistant Examiner—Ronald J. Shore
Attorneys—Richard S. Strickler, Robert H. Bachman, Donald R. Motsko and Thomas P. O'Day

ABSTRACT: A process for providing a high strength weldment by welding together two alloy members which contain 9.0 to 11.8 percent aluminum and a substituent selected from the group consisting of 2.0 to 5.0 percent iron, 0.4 to 2.0 percent chromium, 0.05 to 0.2 percent zirconium, 0.5 to 1.2 percent cobalt, 0.2 to 2.0 percent manganese, welding together the alloy members with a welding filler alloy of like composition, cooling the welding surface at a rate greater than 300° F. per minute, and the article produced thereby.

3,615,282

HIGH-STRENGTH FUSION WELDS IN BETA COPPER-ALUMINUM ALLOYS

The present invention relates to welded structures. More specifically, the present invention resides in a method for fusion welding copper alloys wherein the weldment undergoes surprising hardening upon cooling after welding, thereby eliminating the necessity for subsequent heat treating or cold-working in order to develop requisite mechanical properties of the weldment, and the article produced thereby.

As is well known, welding of metal articles generally results in loss of strength of the weldment thus requiring the aforementioned subsequent heat treatment or working of the article.

Nonheat-treatable alloys such as, for example, many of the copper base alloys are completely softened in the weldment thus requiring subsequent mechanical working such as rolling and etc., in order to restore the strength and hardness of the weldment.

Welding of the heat-treatable copper base alloys also results in softening of the article in the weldment, with the response in the welded zone due to the heat generated varying from complete resolutionizing to gross overaging. Furthermore, the fusion zone itself between the components which have been welded together may be relatively porous, depending upon the quality of the welding operation, thus generating a plane of weakness due to the notching effect produced by the porosity.

The only practical method to restore the strength of the weldment in a non-heat-treatable copper base alloy is by subsequent cold working. It is thus readily seen that in the case of an assembled structure subsequent cold-working may be impossible. In the case of the age-hardenable copper base alloys strength may be restored by heat-treating i.e., complete resolutionizing and then aging of the article or structure. This poses problems, however, in that after welding the individual components together the resultant article may easily undergo distortion caused by the configuration of the article and cooling from the heat treatment temperature.

Accordingly, it is a principal object of the present invention to provide a new and improved method for obtaining high-strength weldments without the requisite strength.

It is a further object of the present invention to provide a weldment as aforesaid which overcomes the disadvantages and numerous limitations attendant upon conventional welding of the copper base alloys.

In accordance with the present invention it has now been found that a two-phase alpha plus beta prime (B' martensite) copper base alloy may be welded whereby an increase in strength of the weldment occurs, i.e., the weldment obtains as high or higher strength then the parent metal.

The process of the present invention comprises; (A) providing at least two alloy members wherein said alloy members are an alloy containing from 9.0 to 11.8 percent aluminum and a substituent selected from the group consisting of 2.0 to 5.0 percent iron, 0.4 to 2.0 percent chromium, 0.05 to 0.2 percent zirconium, 0.5 to 1.2 percent cobalt, 0.2 to 2.0 percent manganese, and mixtures thereof, balance essentially copper, providing that said manganese substituent is employed with said zirconium substituent and said cobalt substituent is employed with said zirconium substituent plus said manganese substituent, (B) providing a welding filler alloy containing from 9.0 to 11.8 aluminum, and a substituent selected from the group consisting of 2.0 to 2.0 percent and mixtures thereof, balance essentially copper, providing that said manganese substituent is employed with said zirconium substituent and said cobalt substituent is employed plus said manganese substituent, (C) positioning said alloying members in a substantially abutting relationship to provide a welding surface, (D) heating said filler alloy to a molten state, (E) applying said molten filler alloy to said welding surface and, (F) cooling at a rate of greater than 300° F. per minute.

Naturally, the present invention contemplates the use of other alloying substituents in the alloy members. Typical alloying substituents may include but are not limited to the following: titanium, molybdenum, columbium, vanadium each in an amount of from 0.4 to 2.0 percent.

The present invention also contemplates the presence of smaller amounts of elements as impurities. Examples of such impurities which can be present may include but are not limited to the following: tin, zinc, lead, nickel, silicon, silver phosphorus, magnesium, antimony, bismuth, and arsenic.

After welding, rapid cooling in air of the weldment occurs by conduction of heat away from the weld area by the parent metal members. It has been found that the cooling rate is rapid and generally in excess of 300° F. per minute. Upon reaching the eutectoid transformation temperature the beta phase is transformed by the continued rapid cooling to martensite. Thus, there is a greater proportion of martensite in the weldment, with the martensite in a total amount generally in the order of about 40 to 60 percent with the balance alpha phase, then is present in the parent metal which thereby imparts an increase in strength of the weldment.

Naturally, however, somewhat lower percentages of martensite will be found with multiple pass welding because of reheating but the percentage will still be higher than in the parent metal.

Below the eutectoid transformation temperature, the minimum cooling rate that is required of the weldment is 300° F. per minute in order to avoid gamma formation. The gamma phase tends to form at temperatures below about 1,049° F. unless the weldment is cooled in excess of the aforementioned rate and would have a detrimental effect on corrosion and impact resistance of the weldment. The aforementioned required rate of cooling is normally achieved by a conventional air cool, although in the case wherein large thicknesses of the alloy are employed, provision must be provided to assure the aforementioned cooling rate is achieved, e.g., by rapid air circulation, a water quench, etc.

It is essential that the filler material show the same response to elevated temperatures and subsequent cooling as the parent metal. Thus, a composition within the aforementioned range of the composition of the parent metal must be employed, i.e., an alloy containing from 9.0 to 11.8 percent aluminum and a substituent selected from the group consisting of 2.0 to 5.0 percent iron, 0.4 to 2.0 percent chromium, 0.05 to 2.0 percent zirconium, 0.5 to 1.2 percent cobalt, 0.2 to 2.0 percent manganese, and mixtures thereof, balance essentially copper, providing that said manganese substituent is employed with said zirconium substituent and said cobalt substituent is employed with said zirconium substituent and said cobalt substituent is employed with said zirconium substituent plus said manganese substituent.

Additional alloying substituents which may be present in the filler alloy include but are not limited to the following: titanium, molybdenum, columbium, and vanadium each in an amount of from 0.4 to 2.0 percent. Elements which may be present in the filler alloy as impurities are the same as aforementioned in the case of the parent alloy, i.e., tin, zinc, lead, nickel, silicon, silver, phosphorus, magnesium, antimony, bismuth, and arsenic.

A further increase in strength may be obtained in the weldment by heat treating at a temperature of about 400° to 700° F. for about 1 hour. This temperature range is low enough so that no significant distortion of complex structures occurs.

Since the strength of the weldment is generally higher than in the parent metal failure in tensile testing will tend to occur in the parent metal rather than in the heat affected zone, or the fusion zone. Thus, due to the increased strength of the fusion zone and heat affected zone, the weld is not critical as an area of greatly reduced strength and ductility.

If desire, the components to be welded together may be heat treated prior to welding in order to obtain an initially high proportion of the beta phase. Thus, the components may be heat treated, i.e., betatized, at a temperature of about 1,400° to 1,600° F. for about 1 hour followed by rapid cooling. It has been found that the beta formed at the annealing temperature and which is transformed by rapid cooling to a martensite structure will not be substantially reduced by reheating caused by the welding operation so that both the base metal and the weldment will have comparatively high strength and moderate ductility.

The metal components may be prepared in any suitable form depending upon the particular type of welding desired.

Protection of the metal components and of the filler material during welding must be provided to prevent aluminum oxide formation. Any standard provision such as inert gas shielding, e.g. employing argon, submerged arc welding, a flux coating on the welding rod etc. is suitable.

The present invention will be more readily apparent from a consideration of the following illustrative examples.

EXAMPLE I

Alloy plate 0.33 inch thick containing about 9.8 percent aluminum, 4.0 percent iron, balance essentially copper was prepared for welding in the customary fashion of bevelling the edges to be joined to form a 60° V-groove and then butted together. The weld was made in three passes; two passes to fill the groove, and a third pass made on the under side after first removing unsound metal by grinding.

The following results, shown in table 1, were obtained for MIG weld plate using an Ampco 10 wire (9.0–11.0 percent aluminum, 1.5 percent iron, balance copper) and reverse polarity followed by cooling in air.

TABLE I

| Location | Rockwell 15T Hardness |
| --- | --- |
| Weld Area | 90 |
| Parent Metal | 86.5 |

EXAMPLE II

As a comparative example the following hardness data, shown in table II, were obtained for 0.33-inch-thick leaded brass CDA No. 353 and leaded bronze CDA No. 544 TIG welded samples after preparation in accordance with example I.

TABLE II

| | Rockwell 15T Hardness | Rockwell 15T Hardness |
| --- | --- | --- |
| Alloy No. | Parent Metal | Weld |
| 353 | 74 | 65 |
| 544 | 68 | 47 |

Thus, it may be readily seen the method of the present invention provides for welded structures of increased strength over those conventionally obtained.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for producing a high strength weldment, the process which comprises:
   A. providing at least two alloy members wherein said alloy members are an alloy containing from 9.0 to 11.8 percent aluminum and a substituent selected from the group consisting of from 0.4 to 2.0 percent chromium, 0.05 to 0.2 percent zirconium, 2.0 to 5.0 percent iron, 0.5 to 1.2 cobalt, 0.2 to 2.0 percent manganese, and mixtures thereof, balance essentially copper, providing that said manganese substituent is employed with said zirconium substituent and said cobalt substituent is employed with said zirconium substituent plus said manganese substituent,
   B. providing a welding filler alloy, said filler alloy containing from 9.0 to 11.8 percent aluminum and a substituent selected from the group consisting of from 0.4 to 2.0 percent chromium, 0.05 to 0.2 percent zirconium, 2.0 to 5.0 percent iron, 0.05 to 1.2 percent cobalt, 0.2 to 2.0 percent manganese, and mixtures thereof, balance essentially copper, providing that said manganese substituent is employed with said zirconium substituent and said cobalt substituent is employed with said zirconium substituent plus manganese substituent,
   C. positioning said alloy members in a substantially abutting relationship to provide a welding surface,
   D. heating said filler alloy to a molten state,
   E. applying said molten filler alloy to said welding surface, and
   F. cooling said welding surface and said filler alloy said cooling at a rate greater than 300° F. per minute below the eutectoid transformation temperature.

2. A process according to claim 1 wherein said welding surface includes at least one beveled edge.

3. A process according to claim 1 wherein said substituent of said alloy members and said filler alloy is iron.

4. A process according to claim 1 wherein said molten filler alloy is applied to said welding surface in a protective atmosphere.

5. A process according to claim 4 wherein said protective atmosphere is argon.

6. A high-strength joined article comprising at least two members of aluminum bronze alloys welded together and containing from 9.0 to 11.8 percent aluminum and a substituent selected from the group consisting of from 0.4 to 2.0 percent chromium, 0.05 to 0.2 percent zirconium, 2.0 to 5.0 percent iron, 0.5 to 1.2 percent cobalt, 0.2 to 2.0 percent manganese, and mixtures thereof, balance essentially copper, providing that said manganese substituent is employed with said zirconium substituent and said cobalt substituent is employed with said zirconium substituent plus said manganese substituent, said structure having a weldment characterized by a metallographic structure containing martensite in an amount greater than in said members with the balance alpha phase, said members being joined together by filler metal containing from 9.0 to 11.8 percent aluminum, and a substituent selected from the group consisting of 2.0 to 5.0 percent iron, 0.4 to 2.0 percent chromium, 0.05 to 0.2 percent zirconium, 0.5 to 1.2 percent cobalt, 0.2 to 2.0 percent manganese, and mixtures thereof, balance essentially copper, providing that said manganese substituent is employed with said zirconium substituent and said cobalt substituent is employed with said zirconium substituent plus said manganese substituent.

7. A high-strength formed article according to claim 5 wherein said substituent of said alloy members and said filler alloy is iron.

UNITED STATES PATENT OFFICE
CERTIFICATE OF CORRECTION

Patent No. 3,615,282   Dated October 26, 1971

Inventor(s) George H. Eichelman, Jr. and Michael J. Pryor

It is certified that error appears in the above-identified patent and that said Letters Patent are hereby corrected as shown below:

Column 1, line 64, after "2.0", first occurance, insert -- to 5.0% iron, 0.4 to 2.0% chromium, 0.05 to 0.2% zirconium, 0.5 to 1.2% cobalt, 0.2 --

Column 1, line 64, after "percent" insert -- manganese --

Column 2, lines 46 and 47, delete "and said cobalt substituent is employed with said zirconium substituent"

Column 4, line 19, delete "0.05" and insert -- 0.5 --

Column 4, line 24, after the word "plus" insert -- said --

Signed and sealed this 11th day of April 1972.

(SEAL)
Attest:

EDWARD M. FLETCHER, JR.
Attesting Officer

ROBERT GOTTSCHALK
Commissioner of Patents